Oct. 12, 1937.  A. A. KUCHER  2,095,707
REPRODUCING APPARATUS AND METHOD
Filed March 27, 1936  3 Sheets-Sheet 2

Andrew A. Kucher INVENTOR.
BY
Geo H Strickland ATTORNEY.

Oct. 12, 1937.  A. A. KUCHER  2,095,707
REPRODUCING APPARATUS AND METHOD
Filed March 27, 1936  3 Sheets-Sheet 3
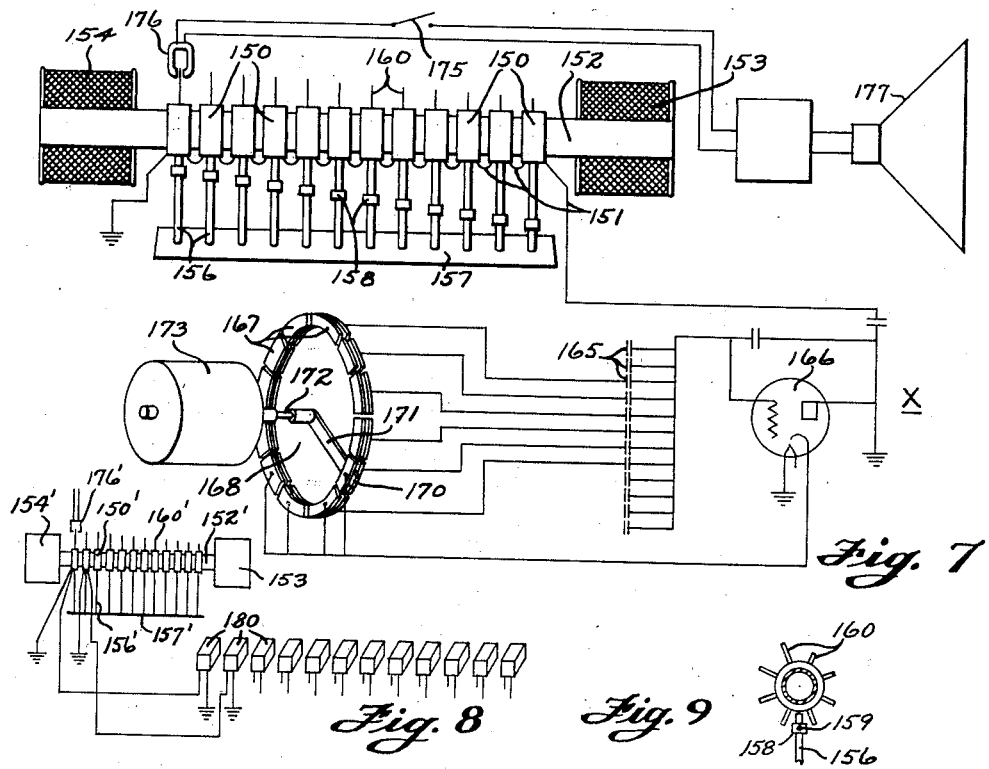
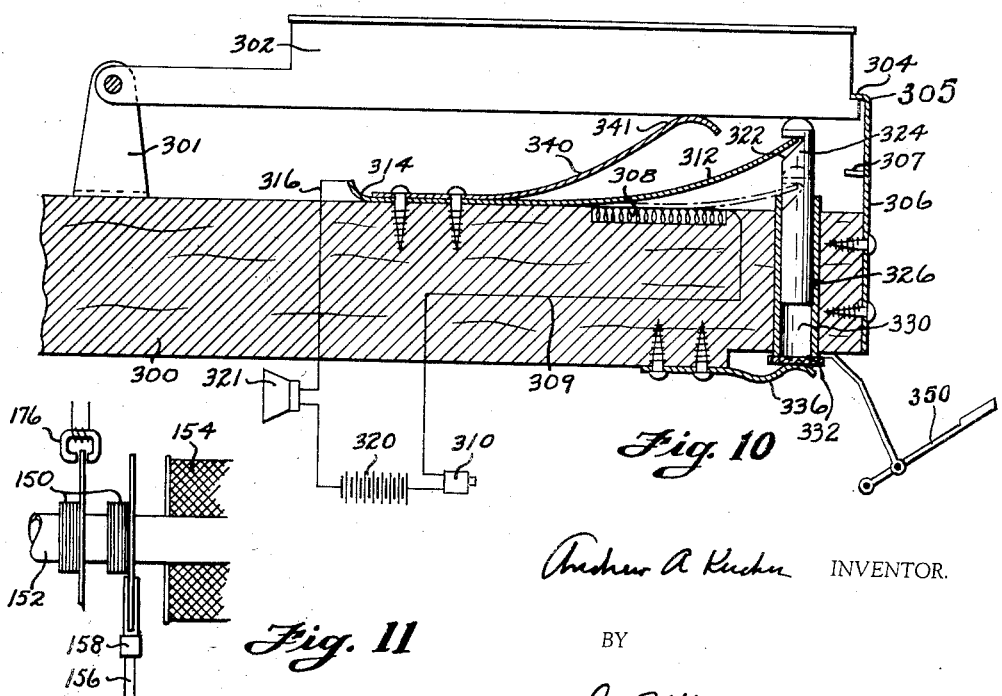
Andrew A. Kucher INVENTOR.
BY
Geo. H. Strickland ATTORNEY.

Patented Oct. 12, 1937

2,095,707

UNITED STATES PATENT OFFICE 2,095,707

REPRODUCING APPARATUS AND METHOD

Andrew A. Kucher, Dayton, Ohio

Application March 27, 1936, Serial No. 71,131

16 Claims. (Cl. 84—1)

My invention relates to the art of reproducing sound, and particularly to the art of reproducing musical notes and tones.

I have found that a plurality of elements, each resonant to a different frequency, may be caused to continuously oscillate by imposing upon all of the elements a rapidly and repeatedly varying frequency of oscillations from a single source.

I make use of this principle in my present invention, the objects of which include methods of and apparatus for continuously oscillating a plurality of elements, each resonant to a different frequency, so that each of such frequencies is available for selection and for reproduction into sound. In carrying out this object of my invention, the elements may be separate elements, all located within a single field, or may be different regions of the same elements, and the continuous oscillation of each of said elements or regions may be brought about by very rapidly and repeatedly, and in some cases continuously, varying the frequency over a range including the frequencies to which the elements or regions are resonant and by imposing this varying frequency upon the field containing the elements or upon the single element containing the different regions.

In a musical instrument, these objects of my invention may be carried out in several ways. For example, elements or regions resonant to each frequency of the musical scale may be subjected to a frequency rapidly and repeatedly varying over the musical range. Or the resonant elements may be arranged in groups consisting of the harmonic octaves and all of such groups may be subjected to rapid and repeated impulses from a single source, the frequencies of which impulses correspond to one, preferably but not necessarily the highest, note of each group. Or, if desired, individual oscillators for each group may be provided.

My invention further contemplates methods of and apparatus for selecting the desired frequency or frequencies from the field or from the single element and for reproducing such selected frequencies into sound.

A still further object of my invention is to provide an improved control or key device for selecting the desired frequency or frequencies from the field containing the continuously oscillating members or regions.

Further objects and advantages of my invention will be apparent from the following description, reference being had to the accompanying drawings wherein I have shown apparatus capable of carrying out the process aspect of my invention.

Fig. 7 is a view partly in perspective and partly diagrammatic of a system wherein the resonant elements are arranged in groups of octave harmonics and the frequencies of the impulses impressed thereon are varied in successive steps;

Fig. 8 is a view in perspective of still another form of apparatus wherein a separate oscillator is provided for each group of elements or regions resonant to the octave harmonics;

Fig. 9 is a front view of one of the groups of octave harmonics of Fig. 7;

Fig. 10 is a view in section of a controlling or key structure;

Fig. 11 is an enlarged view showing a voice coil used in Fig. 7, and

Figure 1:
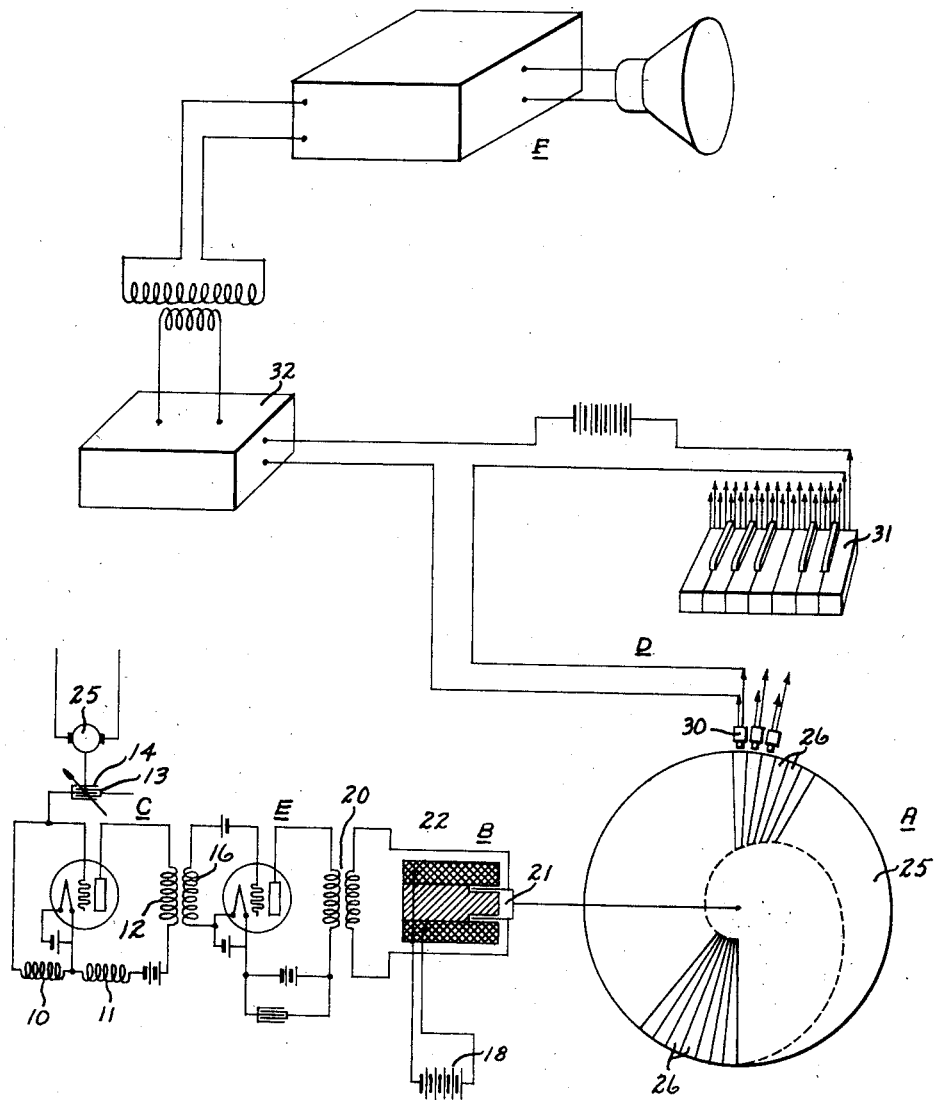
Fig. 1 is a view in perspective of a field or plate containing individual reeds resonant to different frequencies of the musical scale, together with connections, shown diagrammatically, for both a source of varying frequency and for conducting the selected frequencies to a sound reproducing device.

With reference to Fig. 1, I have shown, by means of the reference character A, a field containing a plurality of individual elements, each resonant to a different frequency of the musical scale. The field A is mechanically actuated by a source B, herein shown as the conventional voice coil of a dynamic speaker, which coil is connected in a circuit, generally designated by the letter C, adapted to produce in the source B vibrations having a rapidly and repeatedly varying frequency. Generally designated by the letter D, I have shown a means for selecting and transmitting the selected frequencies from the field A to the sound reproducing device.

Figures 2, 3:
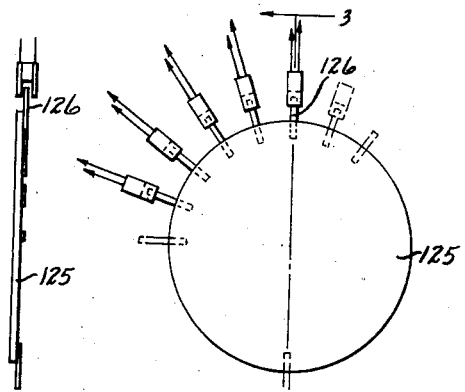
Fig. 2 is a view in perspective of a modified form of field or element wherein the reeds are attached to the element.
Fig. 3 is an end view of the element disclosed in Fig. 2.

Specifically, the circuit C comprises the conventional audion type of oscillation generator wherein the grid and plate circuits are inductively coupled by means of inductances 10 and 11 and wherein the oscillation circuit includes inductances 10 and 11, the primary winding 12 of the transformer and the capacity 13. In this particular type of generator, the frequency of the oscillations depends upon the values of the inductances 10 and 11, the transformer winding 12 and the capacity 13. To vary the frequency of oscillations, I vary the capacity of the condenser 13. To this end, I have shown the movable plates 14 of the condenser 13 connected to a synchronous motor 25 so that the movable plates may be rapidly rotated thereby substantially as shown in Fig. 3 of U. S. Patent No. 1,961,159.

The values of the inductances 10, 11, primary winding 12 and condenser 13 are selected so that the frequency of oscillations produced by the rotation of the movable plates will vary throughout the audible range.

Generally shown at E is an amplifier of conventional design receiving its input from the secondary winding 16 of the transformer and delivering its output to the primary winding of the transformer 20. The secondary winding of the transformer 20 is connected to the voice coil 21 of the dynamic speaker 22, the field of which is energized by the direct current source generally indicated by the reference character 18. The voice coil of the dynamic speaker is shown as mechanically connected to the plate 25, which plate in this particular case constitutes the field having enclosed therein a plurality of individual elements each resonant to a different note of the musical scale.

The field in the particular modification disclosed comprises the plate 25 cut inwardly from its periphery to form reeds 26. There are in all eighty-eight or more of these reeds formed in the plate and each reed is calculated and constructed so as to be resonant to a different frequency of the musical scale. The metal plate has magnetic properties. One example of such metal is high silicon steel.

I have found that by very rapidly rotating the synchronous motor and thereby rapidly rotating the movable plates of the condenser 13, the frequency of oscillations produced by the oscillation generator are very rapidly varied and this varying frequency imposed upon the field or plate 25 will cause all of the individual reeds formed in the plate 25 to continuously oscillate at the frequency to which each of the reeds is resonant. Since the synchronous motor operates continuously during the operation of the musical device, all frequencies of the musical scale are at all times available for selection and transmission to a sound reproducing device.

The speed at which the motor is rotated depends upon the inertia of the elements to be oscillated. In the particular embodiment now being considered, the reeds have a high inertia and consequently the speed obtainable by a motor of the well known type is sufficient to cause continuous oscillation of the reeds. If a higher rate of frequency change in the circuit of the oscillation generator is desired, the condenser may be constructed so that a single rotation of the movable plates thereof by the motor may cause a plurality of complete changes in condenser values rather than but a single change as in the conventional condenser.

The means generally indicated by the letter D, for transmitting the frequencies from the field to a reproducing device F, is shown, for the purposes of illustration only, as a magnetic pick-up 30. There are provided eighty-eight or more individual pick-ups, one for each individual reed in the plate 25 and each of these pick-ups is located in an independent circuit controlled by an individual key generally shown at 31. Depressing one or more keys will result in the pick-up or selection of one or more frequencies and the selected frequencies will be transmitted to the sound reproducing device. If it is desired to have saw tooth oscillations, the selected frequency or frequencies may pass first through an oscillator, shown at 32, which converts the sine wave impulses from the reeds 26 into saw tooth form.

In the apparatus just described, a rapidly, repeatedly, and continuously varying frequency is created in the oscillator circuit by the rotation of the movable plates of the condenser 13. This varying frequency is impressed upon the field, and consequently upon all of the reeds thereof, by the voice coil. Thereafter, from these continuously oscillating reeds, any frequency or frequencies may be selected by depressing one or more of the key controls and the selected frequencies are then transmitted either directly, or through the oscillator 32, to the sound reproducing device.

The field containing the eighty-eight or more oscillating reeds may take on other forms. For example, as shown in Fig. 2, the plate 125 may have attached thereto the individual reeds 126. These reeds are made of metal having magnetic properties and differ from the reeds 26 only in that they are attached to the plate 125, rather than formed in the plate 125. Each reed 126 is resonant to a single frequency of the musical scale and there is a single reed for each frequency.

Figure 4:
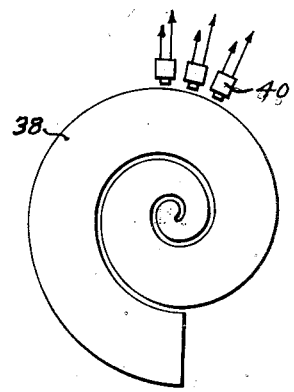
Fig. 4 is a view in perspective of a single element, the different regions of which are resonant to different frequencies.

In place of the plates 25 and 125, having formed therein or carrying the reeds 26 and 126, the field may constitute a single element wherein the different regions thereof are resonant to different frequencies. In Fig. 4, I have shown a single piece of metal 38 having magnetic properties. This metal member is cut spirally so as to present a varying cross section in such a manner that the different regions thereof, considering the member longitudinally, are resonant to different frequencies.

Figure 5:
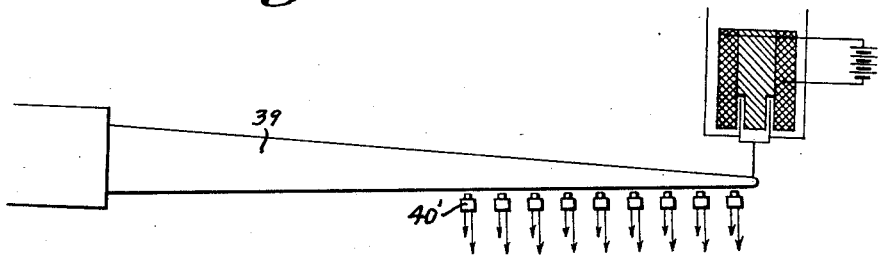
Fig. 5 is a side view.
Figure 6:
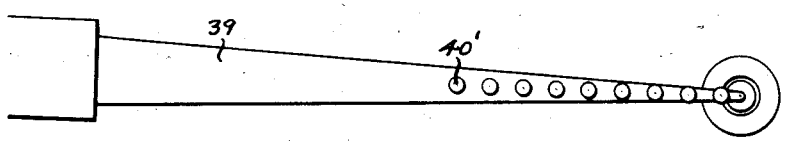
Fig. 6 is a bottom view of a modified form of single element wherein the different regions thereof are resonant to different frequencies.

As an alternative form of single element wherein different regions thereof are resonant to different frequencies, I have shown in Figs. 5 and 6, a bar 39 of varying cross section. This bar is also made of metal having magnetic properties.

In both Fig. 4 and Figs. 5, 6, showing the single element, the regions are formed by the continuously varying cross section of the metal member.

The manner and apparatus for creating the continuous oscillation of the reeds in Fig. 2, or the regions in Figs. 4, 5, and 6, may be similar to that shown and described in connection with Fig. 1. Also the means for selecting and transmitting the selected frequencies from the reeds or regions to the sound reproducing device may be similar to that shown in Fig. 1, although obviously other forms of apparatus could be used.

In the case of the single element containing the different regions, I have shown diagrammatically at 40 in Fig. 4 and at 40' in Figs. 5 and 6 several pick-ups for selecting frequencies from different regions. It should be understood that there are eighty-eight or more of these pick-ups, one for each region and that each is controlled by its individual key control in the manner indicated in Fig. 1.

In all of the embodiments heretofore described, a single voice coil is used to impress the impulses of varying frequencies upon all of the resonant elements or regions. As a modification of such apparatus, the field may be sub-divided into groups, each group containing members resonant to octave harmonics and each group receiving its impulses from a separate voice coil tuned to the frequency of one of the harmonics, preferably but not necessarily the highest harmonic. In this case, all of the voice coils may be subjected to a varying frequency from a single source, which variation may be continuous or in successive steps.

In Fig. 7, such an apparatus is shown as including twelve voice coils, each of which is designated by the reference character 150, connected in series by means of the lead 151 to an oscillation generator, generally indicated by the reference character X. Each coil 150 surrounds in spaced relation the bar 152, which bar is magnetically energized by the D. C. magnets 153 and 154. The bar 152 constitutes a D. C. field for each of the voice coils 150.

Each coil 150 is connected to and supported by a bar reed 156 clamped at its lower end in a rigid element 157 and adapted to be tuned to resonance by the adjustable weight 158 slidable thereon. Each weight 158 may be fixed in adjusted position by its set screw 159.

Figure 12:
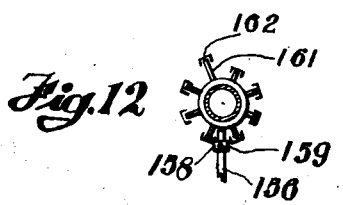
Fig. 12 is an enlarged view of a modified form of reed construction.

Also attached to each coil are resonant elements or reeds 160, each resonant to one harmonic of its group. These resonant elements or reeds 160 may be made of metal having magnetic properties such as high silicon steel or, as shown in Fig. 12, may be made of metal such as bronze 161 with tips 162 made of metal having magnetic properties.

Each of the bar reeds 156 is tuned to one frequency within the octave, preferably but not necessarily the frequency of the highest note, and this frequency impressed upon the voice coil rapidly and repeatedly through the tuned bar reed 156 will cause all of the resonant reeds 160 of the group to oscillate continuously at their own frequencies, or in other words, at the frequencies of the harmonics.

Means are provided for impressing on the voice coils, impulses of varying frequencies corresponding to the frequencies to which the several bar reeds 156 are tuned. This means comprises twelve individual circuits, each containing a fixed condenser, a switch, and a tube oscillator common to all of the circuits. The fixed condensers are shown at 165, each having one plate connected to the grid circuit of the tube oscillator 166 and one plate connected to one contact of a switch 167. Twelve switches 167 are shown and each comprises spaced contacts arranged circumferentially on the disc 168. Rotating between the spaced contacts is a commutator 170 carried on an arm 171 connected to and rotated by the armature shaft 172 of a synchronous motor 173. Rotation of the commutator arm 171 will cause the commutator to successively bridge the spaced contacts of the individual switches to thereby successively close the oscillation circuit through the twelve different condensers.

The values of the fixed condensers are selected so as to produce different frequencies within the oscillation circuit, preferably frequencies corresponding to the frequencies to which the several bar reeds 156 are tuned.

In operation, the motor 173 rapidly rotates the commutator 170 to successively close the twelve switches. The oscillation circuit is thereby closed successively through the twelve different fixed condensers to produce oscillations of twelve different frequencies. These rapidly repeating varying frequencies are impressed upon all of the voice coils in series. Each voice coil will respond to the frequencies to which its bar reed is tuned and will impress upon all of the resonant reeds 160 of its group, frequencies corresponding to those to which the several individual resonant reeds are tuned. Consequently, all of the individual resonant reeds 160 will oscillate continuously at their own frequencies. The speed of the motor is sufficient to vary the frequencies within the oscillation circuit rapidly enough to cause all of the resonant elements or reeds to continuously oscillate.

In this modification, I have shown diagrammatically only one magnetic pick-up for selecting one or more of the frequencies desired. It should be understood that while but a single magnetic pick-up circuit has been shown, there is an individual pick-up circuit for each of the resonant reeds 160. Depressing the key 175 will energize the magnetic pick-up 176 and close the circuit through the sound reproducing device diagrammatically indicated at 177.

In this modification, all of the voice coils are connected in series so that all of the voice coils receive all of the impulses from the oscillation generator. By properly arranging the wiring, each coil may be arranged to receive from the oscillation generator only the impulses of the frequency to which the bar reed carrying the voice coil is tuned.

In Fig. 8 still another form of apparatus is disclosed wherein a separate tube oscillator 180 is provided for each voice coil 150'. Otherwise the apparatus is similar to that shown in Fig. 7 and the parts corresponding to parts of Fig. 7 are indicated by the same reference characters primed. In this form of apparatus each bar reed 156' is tuned to one frequency of the octave harmonics of its group, preferably but not necessarily the highest harmonic. Each tube oscillator generates oscillations of a frequency corresponding to the frequency to which the bar reed to which the tube oscillator is connected, is tuned. The operation of the apparatus is the same as that shown in Fig. 7 except that each bar reed receives only impulses from its own individual tube oscillator.

In Fig. 10 there is disclosed a form of control member which may be used as the means for selecting the desired frequency or frequencies from the field. This control member is shown as including a base 300 carrying the lug 301 to which is pivoted the key 302, the upward movement of which is limited by the stop 304 shown in the form of a flange 305 on the upstanding member 306 secured to the base 300. Downward movement of the key 302 is limited by the stop member 307, likewise formed as a flange on the upstanding member 306.

Located within a cavity on the upper side of the base 300 is an electrical resistance 308, one end of which is connected by means of the lead 309 to the magnetic pick-up 310. Also secured to the upper side of the base 300 is a spring conductor 312, movable into contact with the resistance 308, and having its fixed end 314 connected by a lead 316. Connected in series with the lead 316 and the magnetic pick-up 310 is a conventional sound reproducing device 321.

When the conductor 312 is in contact with the resistance 308, a closed circuit is formed including the resistance 308, the lead 309, the magnetic pick-up 310, the battery 320, reproducing device 321, the lead 316 and the conductor 312.

The movable end of the conductor 312 fits into a slot 322 formed in a piston 324, which piston is mounted for reciprocating movement in a cylinder 326, the lower end of which is provided with an opening 330 controlled by a valve 332. This valve is normally held in a position to close the opening 330 by means of the spring 336. The piston 304 is normally held in its uppermost position by the spring conductor 312.

A spring 340 has one end fixed to the upper side of the base 300 and its movable end 341 is adapted to contact with the under side of the key 302 to normally hold the key 302 in its uppermost position against the stop 304.

In operation, depressing the key 302 moves the piston 324 downwardly in the cylinder 326, thereby moving the conductor 312 as shown in the dotted line position on Fig. 10, into extended contact with the resistance 308, and at the same time forcing the air within the cylinder 326 through the opening 330, past the valve 332. With the conductor in extended contact with the resistance 308, the circuit including the magnetic pick-up is closed and the amount of resistance in the circuit is small.

When the key 302 is released, it is automatically returned to its normal position against the stop 304 by means of the spring 340 acting on the underside thereof. The conductor 312, due to its spring effect, tends to assume its normal position. Its upward movement away from the resistance 308 is retarded by the piston 324, the upward movement of which is governed by the rate at which air leaks into the cylinder either around the piston or through the valved opening.

The speed at which the piston 324 moves upwardly under the influence of the spring conductor 312 and consequently the speed at which the said conductor 312 will move away from the resistance element 308 may be automatically controlled by controlling the valve 332 to regulate the speed at which air enters the cylinder. This control may be, for instance, by means of the foot pedal 350.

When such a device is used as the means for selecting a frequency from the field, obviously the strength of the magnetic pick-up 310 depends upon the value of the resistance 308 in circuit. Immediately upon depressing the key 302, the least amount of resistance is in circuit and consequently the magnetic effect is greatest. This resistance is gradually increased by the slow movement of the conductor 312 away from the resistance, thereby gradually decreasing the effect of the magnetic pick-up until the circuit is finally broken.

While I have disclosed certain forms of apparatus, it should be understood that other forms might be adopted, all coming within the scope of the claims which follow.

I claim:

1. The method which comprises repeatedly and rapidly varying the frequency of oscillations within the acoustic range, imposing said varying frequency on members resonant to individual frequencies, and maintaining the rapidity of such variation of frequency sufficient to establish continuous oscillation of all of said resonant members at their own individual frequencies.

2. The method which comprises repeatedly and rapidly varying the frequency of oscillations within the acoustic range, imposing said varying frequency on members resonant to individual frequencies within the acoustic range, and maintaining the rapidity of such variation of frequency sufficient to establish continuous oscillation of all of said resonant members at their own frequencies.

3. The method which comprises repeatedly and rapidly varying the frequency of oscillations within the acoustic range, imposing said varying frequency on members resonant to frequencies of the musical scale, there being at least one member for each frequency of the musical scale, and maintaining the rapidity of such variation of frequency sufficient to establish continuous oscillation of all of said resonant members at their own individual frequencies.

4. The method which comprises repeatedly, continuously and rapidly varying the frequency of oscillations within the acoustic range, imposing said continuous varying frequency on members resonant to the individual frequencies within the acoustic range, and maintaining the rapidity of such variation of frequency sufficient to establish continuous oscillation of all of said resonant members at their own individual frequencies.

5. The method which comprises repeatedly, continuously and rapidly varying the frequency of oscillations within the acoustic range, imposing said continuous varying frequency on members resonant to the frequencies of the musical scale, there being at least one resonant element for each musical frequency, and maintaining the rapidity of such variation of frequency sufficient to establish continuous oscillation of all of said resonant members at their own individual frequencies.

6. That step in the art of producing frequencies within audible range which comprises imposing rapidly varying frequencies of oscillations concomitantly upon members continuously resonant to individual frequencies within the audible range.

7. That step in the art of producing frequencies within the audible range which comprises imposing continuous and rapidly varying frequencies of oscillations concomitantly upon members resonant to all of the frequencies of the musical scale.

8. In a musical instrument, a single element having a plurality of regions resonant to different frequencies of the musical scale, means for causing all of said regions to oscillate continuously at their own individual frequencies, said means comprising an oscillation generator having means for rapidly and repeatedly varying the frequency of oscillations, means for selecting one or more frequencies and for reproducing said selected frequency or frequencies.

9. In a musical system, a single element having eighty-eight or more separate regions each resonant to a different note of the musical scale, a single source of oscillations the frequencies of which correspond to the frequencies of the resonant members, means mechanically connecting said single source to said single element to cause said regions to continuously oscillate, and means for selecting said frequencies of said regions as desired.

10. A key for use in musical instruments including a variable control element having two extreme positions, means for rapidly moving said control element to one of its two positions and means for slowly moving said control element from its said one position to the other position.

11. A key for use in musical instruments including a variable control element having two extreme positions, means for rapidly moving said control element to one of its extreme positions, and for slowly returning said control element from its said one extreme position to its other extreme position and means for adjusting said last named means whereby the rate of movement of said control element from said one extreme position to the other may be varied.

12. A key for use in musical instruments including a variable electric resistance having a member movable thereon between extreme positions for varying the effect of said resistance, means for rapidly moving said movable member to one of its two extreme positions and means for slowly moving said movable member from its said one extreme position to its other extreme position whereby the effectiveness of said resistance is gradually and slowly changed.

13. A key for use in musical instruments including a variable electric resistance having a member movable thereon between extreme positions for varying the effect of said resistance, means for rapidly moving said movable member to one of its two extreme positions and means for slowly returning said movable member from its said one extreme position to its other extreme position whereby the effectiveness of said resistance is gradually and slowly changed, and means for adjusting the effect of said last named means.

14. A key for use in musical instruments including a resistance element, a conductor movable along said resistance between two extreme positions, means for moving said conductor rapidly to one of its extreme positions, said means including an element movable from a normal position, means for rapidly returning said last named means to its normal position and means for slowly returning said conductor from its said one extreme position to its other extreme position.

15. A key for use in musical instruments including a resistance element, a conductor movable along said resistance between two extreme positions, means for moving said conductor rapidly to one of its extreme positions, said means including an element movable from a normal position, means for rapidly returning said last named means to its normal position and means for slowly returning said conductor from its said one extreme position to its other extreme position, said last named means being adjustable whereby the rate of movement of said conductor from its said one extreme position to its other extreme position may be varied.

16. In a musical instrument, a single member having a plurality of regions, each region being resonant to a single frequency of the musical scale, means for causing all of the regions of said single member to continuously oscillate at its own selected frequency, means for selecting one or more of said frequencies, and means for transmitting the selected frequencies to a sound reproducing device.

ANDREW A. KUCHER.